(12) United States Patent
Barenbrug et al.

(10) Patent No.: US 8,599,313 B2
(45) Date of Patent: Dec. 3, 2013

(54) ADAPTIVE CONTENT RENDERING BASED ON ADDITIONAL FRAMES OF CONTENT

(75) Inventors: Bart Gerard Bernard Barenbrug, Waalre (NL); Leo Jan Velthoven, Eindhoven (NL); Mark Jozef Willem Mertens, Eindhoven (NL); Michiel Adriaanszoon Klompenhouwer, Breda (NL); Frederik Jan De Bruijn, Eindhoven (NL)

(73) Assignee: TP Vision Holding B.V., Eindoven (NL)

( * ) Notice: Subject to any disclaimer, the term of this patent is extended or adjusted under 35 U.S.C. 154(b) by 319 days.

(21) Appl. No.: 12/294,625

(22) PCT Filed: Mar. 29, 2007

(86) PCT No.: PCT/IB2007/051126
§ 371 (c)(1), (2), (4) Date: Apr. 23, 2010

(87) PCT Pub. No.: WO2007/113754
PCT Pub. Date: Oct. 11, 2007

(65) Prior Publication Data
US 2010/0201878 A1    Aug. 12, 2010

Related U.S. Application Data

(60) Provisional application No. 60/788,476, filed on Mar. 31, 2006.

(51) Int. Cl.
*H04N 5/445* (2011.01)
*H04N 5/57* (2006.01)
*H04N 5/58* (2006.01)

(52) U.S. Cl.
USPC .......................... 348/563; 348/602; 348/739

(58) Field of Classification Search
USPC .......... 348/602, 603, 563, 564, 553, 739, 383
See application file for complete search history.

(56) References Cited

U.S. PATENT DOCUMENTS

| 6,611,297 B1 * | 8/2003 | Akashi et al. ................. 348/739 |
| 2003/0035482 A1 | 2/2003 | Klompenhouwer et al. |
| 2005/0041164 A1 * | 2/2005 | Sato .............................. 348/744 |

FOREIGN PATENT DOCUMENTS

| WO | 2004006570 A1 | 1/2004 | |
| WO | WO 2004/006570 A1 * | 1/2004 | ............... H04N 5/57 |

OTHER PUBLICATIONS

R.B. Wittebrood et al; "Real-Time Recursive Motion Segmentation of Video Data on a Programmable Device", IEEE Transactions on Consumer Electronics, Aug. 2001, pp. 559-567.

*Primary Examiner* — Michael Lee
(74) *Attorney, Agent, or Firm* — Shimokaji & Associates, P.C.

(57) ABSTRACT

A device and method for rendering content that includes analyzing previous and/or subsequent temporal portions of a content signal to determine elements that are positionally related to elements of a current portion of the content signal. The current portion of the content signal is rendered on a primary rendering device, such as a television, while the elements that are positionally related to elements of a current portion of the content signal are concurrently rendered on a secondary rendering device. In one embodiment, the elements that are rendered on the secondary rendering device may be rendered at a lower resolution and/or lower frame rate than the rendered current portion of the content signal. In one embodiment, at least one of previous and subsequent temporal portions of a content signal may be analyzed at a lower resolution than the content signal.

52 Claims, 5 Drawing Sheets

ADAPTIVE CONTENT RENDERING BASED ON ADDITIONAL FRAMES OF CONTENT

The present system relates to video display units having ambient lighting effects wherein ambient light characteristics are adapted based on a plurality of image frames.

Systems are known that adjust presentation of content by changing an aspect ratio of content from an aspect ratio of the provided content to an aspect ratio of a presentation device. The aspect ratio generally refers to the image outline such as a rendered images width to height ratio.

For example, an aspect ratio of 16:9 has widely been adopted as a standard display shape for high-end television sets, yet most television broadcasts are transmitted in a 4:3 aspect ratio. At the same time, large amounts of image material with other aspect ratios (e.g., 16:9, 14:9, etc.) are provided while this material is ultimately displayed on display devices with a 4:3 aspect ratio. Due to this mismatch, some form of aspect ratio conversion is typically provided.

In one system for providing a 4:3 to 16:9 conversion, black bars are added at the sides of displayed content providing what is termed a "letterbox" presentation. This method supplies no real 16:9 result, yet is typically provided to eliminate image distortion introduced by other methods. In an alternate system, images (e.g., motion picture frames) may be magnified by stretching the content horizontally and vertically, yet this system results in information at a top and bottom of the content being lost. In yet another embodiment, content may be stretched in only the horizontal direction, yet this system results in displayed objects in the content being distorted resulting in a change in the shape of objects (e.g., circular objects become oval shaped). Similarly, displayed content may be stretched horizontally with a non-uniform zoom factor such that objects on the side of the displayed image are more stretched than objects in the center of the displayed image. This system provides for centrally positioned objects to be displayed with little or no distortion, yet when these objects move from one portion of the display (e.g., center of the display) to another portion of the display (e.g., edge of the display), the object will be subjected to different zoom factors as it crosses the display which can be quite distracting. This problem is exacerbated by content that originates as 16:9 content, such as motion picture content, that is edited for television presentation. Oftentimes, this content is provided utilizing a "pan-and-scan" technique wherein the motion picture content is scanned from one side of the motion picture content to another side of the motion picture content to create the 4:3 aspect ratio content that is subsequently broadcasted. In this pan-and-scan presentation, objects are constantly moving from one side of the display to another.

U.S. Patent Publication No. 2003/0035482 to Klompenhouwer (the "Klompenhouwer patent"), which is incorporated herein by reference as if set out in entirety herein, describes a system for extending a given image by utilizing pixels from a previous and/or subsequent image. For example, for a provided moving image that has a global motion moving to the right, previous images may be utilized to fill-in pixels to the left of the given image without distorting objects depicted in the given image. Similarly, for stored content or content that is available some time prior to being displayed and a global motion moving to the right, subsequent images may be utilized to fill-in pixels to the right of the given image. While this system provides a more natural presentation of content than prior solutions, it does nothing to enhance the presentation of content beyond the display device.

Koninklijke Philips Electronics N.V. (Philips) and other companies have disclosed means for changing ambient or peripheral lighting to enhance video content for typical home or business applications. Ambient lighting added to a video display or television has been shown to reduce viewer fatigue and improve realism and depth of experience. Currently, Philips has a line of televisions, including flat panel televisions with ambient lighting, where a frame around the television includes ambient light sources that project ambient light on a back wall that supports or is near the television. Further, light sources separate from the television may also be utilized to produce ambient light that extends beyond the television display.

PCT Patent Application WO 2004/006570 incorporated herein by reference as if set out in entirety, discloses a system and device for controlling ambient lighting effects based on color characteristics of displayed content, such as hue, saturation, brightness, colors, speed of scene changes, recognized characters, detected mood, etc. In operation, the system analyzes received content and may utilize the distribution of the content, such as average color, over the entire display or utilize the portions of the displayed content that are positioned near the border of the display to control ambient lighting elements. The ambient light feature generally uses the video content of the display itself to generate the ambient lighting effects on a per frame basis together with temporal averaging to smooth out temporal transitions of the ambient lighting elements. In other systems, a lighting script may be utilized to generate the ambient lighting effects in coordination with currently depicted images. While this system effectively expands the perceived image size, in fact, the prior ambient lighting systems typically merely expand the objects and scene provided in a given frame of content.

It is an object of the present system to overcome disadvantages in the prior art and improve on the ambient lighting effect to facilitate a more immersive viewing experience.

The present system provides a device and method for rendering content. The device and method include analyzing previous and/or subsequent temporal portions of a content signal to determine elements that are positionally related to elements of a current portion of the content signal. The current portion of the content signal is rendered on a primary rendering device, such as a television, while the elements that are positionally related to elements of the current portion of the content signal are concurrently rendered on a secondary rendering device. In one embodiment, the elements that are rendered on the secondary rendering device may be rendered at a lower resolution than the rendered current portion of the content signal. In one embodiment, at least one of previous and subsequent temporal portions of the content signal may be analyzed at a lower resolution than the content signal.

The elements that are rendered on the secondary rendering device may be rendered at a varying resolution, wherein the varying is determined based on a position of the rendered element in relation to the content signal rendered on the primary rendering device. In another embodiment, the elements that are rendered on the secondary rendering device may be rendered at a resolution that is determined based on a position of the rendered element in relation to the content signal rendered on the primary rendering device. The elements that are rendered on the secondary rendering device may be rendered at a resolution that is determined based on a temporal position of the rendered element in relation to the content signal rendered on the primary rendering device.

The elements rendered on the secondary rendering devices may be rendered utilizing auxiliary data, such as Ambient Experience data (AMBX) and Supplemental Enhancement Information (SEI), related to the determined elements. The auxiliary data may be associated with the content signal, such as broadcast together with the content signal or stored together with the content signal. In this way, processing requirements at the site of the primary rendering device may be reduced and/or more accurate information related to the rendered elements may be provided. The auxiliary data may also provide information to assist determining a positioning of features and/or objects on the secondary displays.

In one embodiment, the secondary rendering device may be an ambient lighting rendering device and the elements may be rendered as ambient lighting elements. In the same or an alternate embodiment, the secondary rendering device may be one or more peripheral rendering devices (e.g., displays) and the elements may be rendered as peripheral image elements. As utilized herein, a peripheral rendering device/display is intended to describe a rendering device/display that is in a vicinity of the primary rendering device. The determined elements may be determined based on a position of the secondary rendering device with respect to the primary rendering device. The secondary rendering device may include a plurality of secondary displays. The determined elements may be determined based on a position of each of the secondary rendering devices with respect to the primary rendering device. The determined elements may be determined based on auxiliary data, such as Ambient Experience data (AMBX) and Supplemental Enhancement Information (SEI), associated with the content.

The secondary rendering device may include two or more secondary rendering devices with one of the secondary rendering devices positioned to a one side (e.g., above, below, left side, right side) of the primary rendering device and another one of the secondary rendering devices positioned to another side of the primary rendering device. In one embodiment, each of the previous and subsequent temporal portions of the content signal may analyzed to determine the elements, for example for secondary rendering devices that are positioned to the left and right of the primary rendering device. In one embodiment, the elements rendered on the secondary rendering device may be rendered at a slower frame rate than the content signal rendered on the primary rendering device.

The following are descriptions of illustrative embodiments that when taken in conjunction with the following drawings will demonstrate the above noted features and advantages, as well as further ones. In the following description, for purposes of explanation rather than limitation, specific details are set forth such as the particular architecture, interfaces, techniques, etc., for illustration. However, it will be apparent to those of ordinary skill in the art that other embodiments that depart from these specific details would still be understood to be within the scope of the appended claims. Moreover, for the purpose of clarity, detailed descriptions of well-known devices, circuits, and methods are omitted so as not to obscure the description of the present system.

It should be expressly understood that the drawings are included for illustrative purposes and do not represent the scope of the present system. In the accompanying drawings, like reference numbers in different drawings may designate similar elements.

Figure 1:
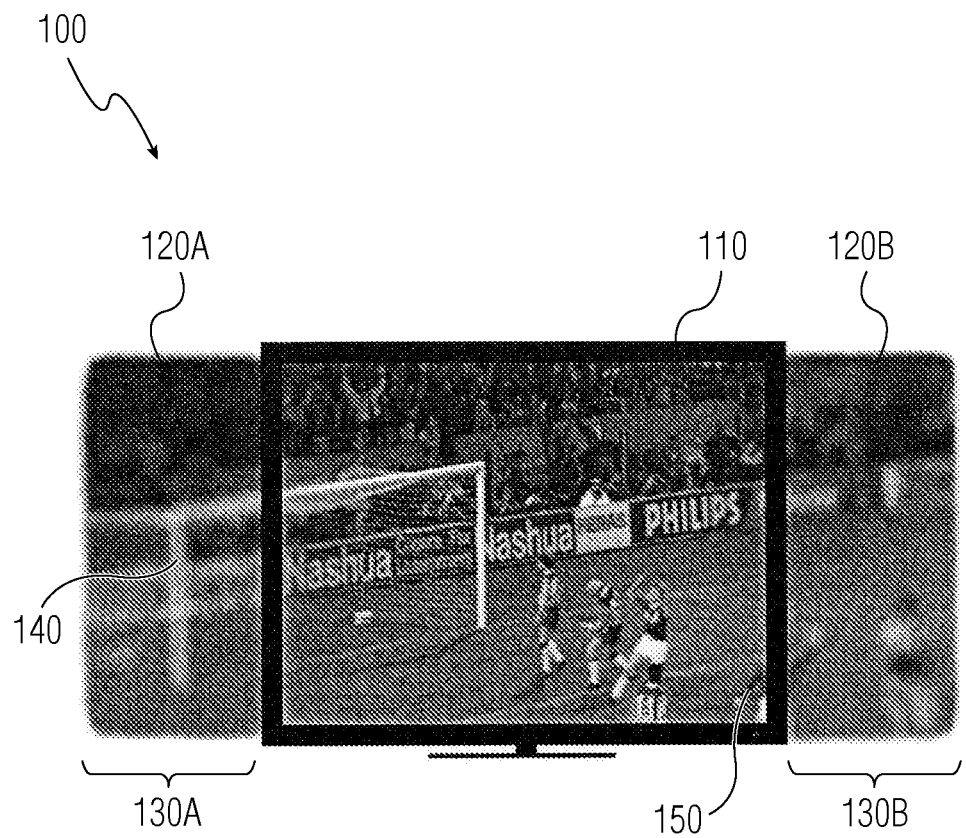
FIG. 1 shows an embodiment of the present system configured to enhance a viewing experience of a display in accordance with an embodiment of the present system.

FIG. 1 shows an embodiment 100 of the present system configured to enhance a viewing experience of a display 110 by creating light patterns 120A, 120B, outside of a normal viewing area, such as a 4:3 aspect ratio display area. In this embodiment, contents of this augmentation are not simply derived from the current video content shown on the screen or parts thereof, for example as may be applied in prior ambient lighting features by computing an extension of the current video frame to an area outside of the current video image. In the embodiment shown, a current rendering of video content (e.g., a displayed frame of video content) provided in a 4:3 aspect ratio image is extended by extension images (e.g., one or more of light patterns 120A, 120B) derived from prior and/or subsequent frames (prior or subsequent to a current frame) of video content. The prior and/or subsequent frames of video content may include one or more prior and/or subsequent video frames. In one embodiment, only a portion (e.g., such as a feature, object, and/or element generally) of a prior and/or subsequent video frame may be analyzed. For example, a background feature of a previous frame may be analyzed without examining the entire previous frame. In one embodiment, two or more frame portions may be analyzed. For example, two consecutive previous frame portions, or one previous portion and a current frame portion may be utilized in accordance with the present system. In another embodiment when two frame portions (e.g., including at least one of a previous or subsequent frame portion) are analyzed to determine a light pattern (e.g., light pattern 120A), the frame portions need not be temporally consecutive although, in an embodiment, the frame portions may be temporally consecutive. One or more of the extension areas 130A, 130B may be provided by an ambient lighting feature in accordance with the present system, such as provided by rendering (e.g., projecting) one or more ambient lighting images on a wall that is positioned behind the display 110 from the perspective of a viewer of the display 110. Naturally, one or more of the light patterns 120A, 120B may be provided by one or more rendering devices affixed to the display 110 and/or by one or more rendering devices (e.g., projector), or other devices that are separate from the display 110 and that have an ability to render (display and/or project) one or more of the light patterns 120A, 120B. In one embodiment, on or more of the light patterns 120A, 120B may be provided by one or more display devices. For example, the light pattern 120A may be provided by two or more display devices operating as ambient lighting elements. Similarly, the light pattern 120B may be provided by two or more display devices operating as ambient lighting elements.

In one embodiment in accordance with the present system, one or more of the light patterns 120A, 120B are provided in a resolution that is lower than the presented frames on the display 110. For example, one or more of the extension areas 130A, 130B may be provided by 20×40 pixels of resolution per extension area. Naturally in other embodiments, more or less resolution may be provided with an appreciation that a higher resolution typically requires more processing to discern the light patters than are required for providing a lower resolution light pattern.

For example, in accordance with the present system, global and/or local motion vectors of frames and/or objects depicted in frames (e.g., preceding and/or proceeding frames) may be determined for use in accordance with the present system and/or may be determined as a by-product of other portions of the system, such as may be utilized during Moving Picture Experts Group (MPEG) image processing. For a video image that has a global motion vector (e.g. of the background/priority of pixels) of the image provided in the display 110 (e.g., goal 140) or a local motion vector of an object that is moving to the right as the video frames provided on the display 110 temporally progress, the light pattern 120A may be discerned from one or more frames of video content that precede the frame currently shown on the display 110. The size of motion vectors of the frame (global) and/or object (local) and the width of the light pattern 120A provided in the extension area 130A may be utilized in determining how many previous frames are examined to determine the light pattern 120A as may be readily appreciated. In one embodiment in accordance with the present system, for larger motion vectors, less previous frames may be utilized (e.g., one or more previous frames) for discerning the light pattern 120A, although in another embodiment, the same number of previous frames may be examined regardless of the size of the motion vectors. For example, in one embodiment, when the motion vectors are larger, more resolution may be provided in the extension area 130A.

Similarly, in a video image that has a global motion vector of the image provided in the display 110 or a local motion vector of an object, such as a depicted player 150, that is moving to the right as the video frames provided on the display 110 temporally progress, the light pattern 120B may be discerned from one or more frames of video content that proceed the frame currently shown on the display 110. This processing is facilitated when the frames of the video content are available some time before being presented on the display 110, such as when the content is stored locally and/or is buffered for some time prior to presentation on the display 110. The size of the motion vectors of the frame (global) and/or object (local) and the width of the resolution provided in the extension area 130B may be utilized in determining how many proceeding frames are examined to determine the light pattern 120B as may be readily appreciated. In one embodiment in accordance with the present system, for larger motion vectors, less proceeding frames may be utilized (e.g., one or more proceeding frames) for discerning the light pattern 120B, although in another embodiment, the same number of proceeding frames may be examined regardless of the size of the motion vectors. For example, in one embodiment, when the motion vectors are larger, more resolution may be provided in the extension area 130B.

Naturally should the global and/or local motion vectors be moving to the left, one or more preceding frames may be utilized to discern the light pattern 120B depicted in extension area 130B. Similarly, for global and/or local motion vectors moving to the left, one or more proceeding frames may be utilized to discern the light pattern 120A depicted in extension area 130A.

In this type of embodiment, the resolution provided in one or more of the extension areas 130, 130B may be dynamically determined based on the size of the determined motion vectors. As may be readily appreciated, the accuracy of the images shown in the extension areas 130A, 130B may decrease as the frames utilized to derive the light patterns 120A, 120B become more temporally remote from the frame of data displayed on the display 110. Further, the accuracy of image portions shown in the extension areas 130A, 130B may decrease as image portions of the frames utilized to derive the light patterns 120A, 120B become more physically remote from the current image portions shown in the frame of data displayed on the display 110. In other words, the further the light patterns 120A, 120B are extended, thereby extending the "complete image" made up by the frame currently being displayed on the display 110 together with the light patterns 120A, 120B being displayed in the extension areas 130A, 130B, the accuracy of the remote areas of the extension areas 130A, 130B may be reduced. Accordingly, the term physically and positionally remote is intended to include objects that are positioned further from the frame currently being displayed on the display 110 in terms of the complete image and/or the light patterns 120A, 120B that are produced further from the display device 110 since one or both of proximity within the complete image and proximity to the display 110 may be utilized for determining the content rendered within the extension areas 130A, 130B. To compensate for this occurrence in some cases, the resolution of the physically and/or temporally remote areas of the extension areas 130A, 130B may decrease as the extension areas 130A, 130B become more physically and/or temporally remote from the images rendered on the display 110.

In one embodiment in accordance with the present system, natural motion techniques, such as those applied in the Klompenhouwer patent may be used to temporally predict what is visible outside of the video frame rendered on the display 110. Natural Motion tracks objects in the scene and may therefore extrapolate the objects motion outside of the frame when they have moved off-screen (e.g., beyond the display 110). In this way, a determination of the content provided to the extension areas 130A, 130B may be made utilizing computations that are already provided to enable the natural motion image smoothing.

Since in one embodiment, the images provided in the extension areas may be of low resolution and thereby be somewhat blurred, a lower resolution may be provided in the remote areas (as discussed above) to balance an amount of detail provided with a desire to conceal potential extrapolation artifacts. In one embodiment, it may suffice to perform the image/object tracking at low-resolution, thereby tracking blurry versions of large objects, or so-called object blobs. Tracking of object blobs may be performed at low computational complexity, since this may be performed on downscaled versions of the video content. For example, a red car in the video content displayed on the display 110 may (when it moves off-screen) continue as a red blob in the extension area(s). So the data on the auxiliary displays need not be an exact low resolution version of a projection of the current surrounding from the images for the primary display, but may be as simple as an blob shape resembling a generally shape of the object (e.g., elliptically shaped), for an object and a globally structured color profile for the background (in the example of the soccer field, that would be a slanting grass green lower half, and a dull, perhaps statistically textured grayish area for the upper audience half, upon which a low resolution color gradient could be superimposed if that is actually approximately present in the imaged audience background). Note that for peripheral display as discussed in more detail below, (perspective) deformation is allowable, since vision is not acute and only the feeling of immersion may be required. Accordingly, a determination of a perspective deformation may be applied for the light patterns (e.g., features, objects, background, etc.), generally referred to as elements, in the extension areas and/or the images provided in peripheral displays as may be readily appreciated. In one embodiment, background elements may be presented without perspective deformation while foreground elements (e.g., car, player, etc.) are deformed after determination of the elements to provide perspective (e.g., stretching of elements along an angle originating with the display 110 and emanating outward therefrom.

In an embodiment wherein the natural motion approach is combined with the low resolution of the light patterns 120A, 120B, one can observe that an object that has moved off-screen, has been/will be present in past/future video frames, so showing such an off-screen object is similar to showing past/future image content, or in one embodiment, at least a simplified approximation/model of such isolated content/element(s). So a very low-cost implementation is possible where a global motion model estimates the global motion (and thereby implements the tracking), which determines how far in the past (or future) images should be taken on which to base the images provided in the extension image(s) 130A, 130B. Determining the extension image is in this case equivalent to delaying (or advancing) extension images (colors in case of very low-res) as they may be computed by prior ambient lighting systems, where the amount of delay/advancement may be determined by the tracking done by the global motion estimator. By buffering the extension images instead of the original video, little buffering is required, and the feature may be implemented without substantially increasing the cost of prior systems.

In accordance with an embodiment of the present system, it may be advantageous to make a distinction between foreground (e.g., foreground object 252) and background (e.g., background object 254) objects, scenes, or generally, features (e.g., with a foreground/background detection algorithm, such as based on motion and occlusion, although other suitable systems may be readily applied), to track those separately, and for example, compute the extensions based solely on one of the background or foreground features. In yet another embodiment, a presence of three-dimensional (3D) information (e.g., in a form of depth maps that are transmitted as extra layers, in accordance with the MPEG-C part 3 standard) may be of help in identifying features and which features are foreground and background, so these features may be more easily tracked and properly positioned in the extension area(s).

In accordance with one embodiment, the processing for the extension area(s) may be performed by the main display hardware, where the resulting extension light pattern(s) are communicated to any secondary display area(s) (e.g., display surfaces, displays, etc.) that are used to display the extension light pattern(s). In another embodiment, one or more processors for the extension area(s) may be fed the same video stream as the primary display, where each of the one or more processors performs the analysis (or the part it needs) and thereby, determines its own portion for rendering. In one embodiment, a particular partitioning of the system may have the tracking and prediction part separate from the display(s) altogether (e.g., at the content creation side), whereby the extension light pattern(s) (e.g., parameterized to allow for different sizes and shapes of the extension visualization) are transmitted along with the video content, for example in the form of Ambient Experience (AMBX) information (e.g., scripts, software engine, architecture, etc.) and/or in the form of Supplemental Enhancement Information (SEI) within the Advanced Video Coding (AVC) standard.

Several systems and/or methods may be used to project/provide the extension image area(s) to the environment of the main display. While particular embodiments are described herein, as may be readily appreciated by a person of ordinary skill in the art, other embodiments may be envisioned which also fit within the scope of the present system.

In one or more embodiments in accordance with the present system, portions of the ambient rendering system may be built into the main display (e.g., a bezel of the main display) using prior ambient lighting hardware, or extending the prior hardware towards more resolution using, for example, micro-projectors.

In one embodiment, by displaying a proper extension of the image currently provided in the main display area (e.g., in place of a color which resembles the current color at the side of the image), only the previously described processing needs to be added to a prior ambient lighting television to implement the present system. It should be noted that the present system and prior ambient lighting solutions track objects somewhat differently and thereby, provide different content in the ambient lighting areas. In a case wherein a red object is displayed in front of a green background, when the red object moves off-screen on a prior ambient lighting television, the ambient lighting will turn green as soon as the red object is off-screen. In an embodiment in accordance with the present system, a corresponding ambient lighting effect (e.g., produced in one of the extension areas 130A, 130B) may stay red for a while afterwards thereby showing the red object moving beyond the main screen border, depending on, for example, the objects last-known motion, the global motion estimated for the frames after it has moved off-screen, and/or the speed as obtained from an object based motion estimator, as for example provided in "Real-Time Recursive Motion Segmentation of Video Data on a Programmable Device", by R. B. Wittebrood and G. de Haan, published in IEEE Transactions on Consumer Electronics, August 2001, pp. 559-567, incorporated herein by reference thereto as if set out in its entirety. In accordance with the present system, the time that the off-screen (e.g., display 110) image/colors are shown, may depend on the speed that the object is moving (e.g., a size of the related motion vector, high speed=short duration), while in accordance with one embodiment of the present system, theses colors (e.g., attributable to the red car) may fade to a default color (e.g., the background color) after a while even for slow speeds (e.g., speeds wherein the motion of the object may not have yet moved the object outside of the extension area(s)). As may be readily appreciated, in some embodiments, the fade of a present system may be too slow for fast moving objects which leave the extension area very quickly.

Prior ambient lighting systems may already be made up of multiple light sources (e.g., to increase light output, and to produce different colors at different sides). By controlling each light source individually, and, for example, adding a lens and/or diffuser (system), a low-resolution image may be projected onto the environment around the primary display (e.g., left, right, above and/or below the display 110). In further embodiments, a ceiling and/or floor around the primary display may also be illuminated by ambient lighting elements present on the display and/or as provided by ambient lighting elements that are remote to the primary display, such as may be provided by a dedicated ambient lighting tower or combined ambient lighting device/speaker. In one embodiment, ambient lighting micro-projectors may also take the shape of separate peripherals (e.g. stand-alone micro-projector pods that may be placed according to the desires of the user). As may be readily appreciated, other systems for providing the ambient lighting may be utilized in accordance with the present system.

Figure 2:
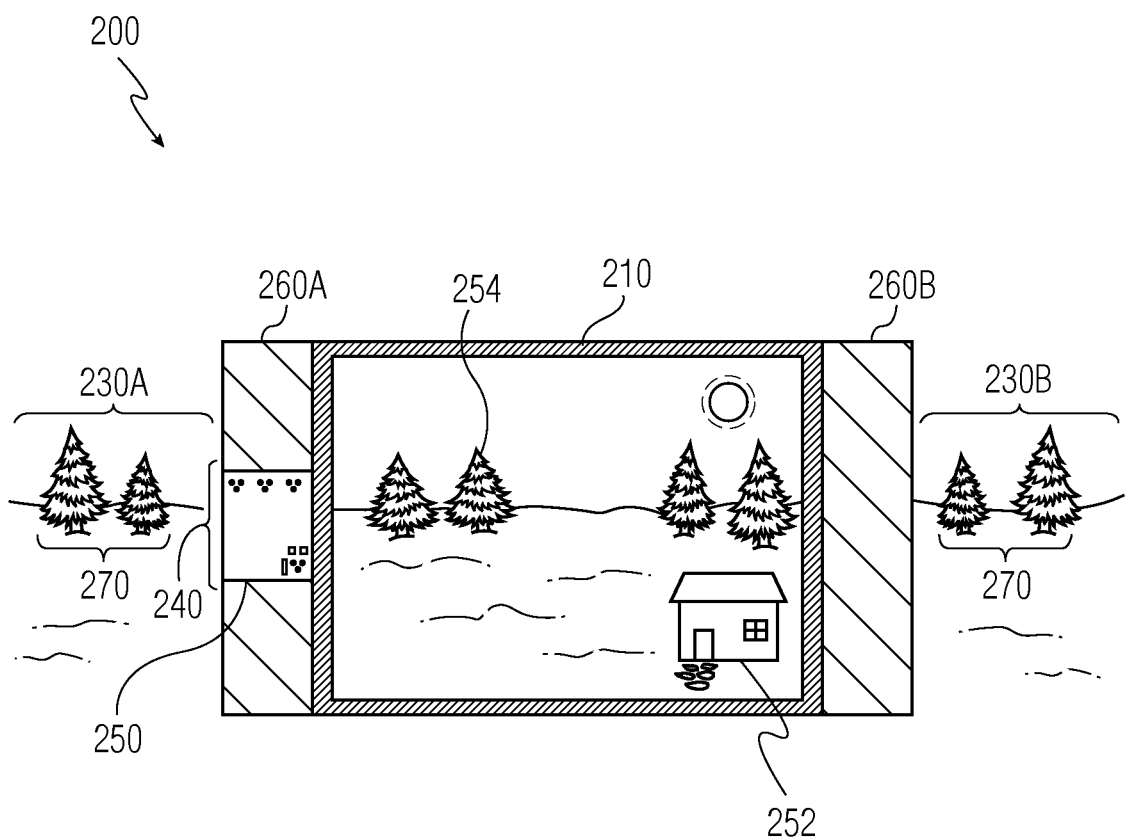
FIG. 2 shows a front view of a system in accordance with an embodiment of the present system.

FIG. 2 shows a front view of a system 200 in accordance with an embodiment of the present system. In one embodiment, a display 210, such as a liquid crystal display (LCD) based display device, may be utilized to provide a low-resolution ambient lighting system. In the embodiment shown in FIG. 2, one or more of ambient lighting panels 260A, 260B may be added to the display 210. The ambient lighting panels 260A, 260B may be provided as add-ons (e.g., provided in a manufacturing plant, or connected aftermarket by a home user, for example via a bus and protocol). In one embodiment, the ambient lighting panels 260A, 260B may include an ambient light source 250, such as micro-projectors, individual or grouped light emitting diodes (LED's), etc. In one embodiment, a patterned ambient lighting effect may be provided by controlling separate outputs of an M×N array of LEDs (e.g. RGB triplets) behind a lens/diffuser system 240, provided to create a scaled low resolution picture.

In this embodiment, the output of the ambient light source 250 may be configurable. For example, the ambient light source 250 may be positioned/repositioned to select the area irradiated by the ambient light source, such as may be provided by a wall positioned behind/around the display 210, or positioned reflection screens. In one embodiment, the lens 240 may also be adjusted, manually and/or automatically for wall projection as a function of an angle formed between the display 210 and the wall angle. For example, in one embodiment, a micro-projector may be operably attached to the display to be rotatable around the vertical. In an automatically adjusted embodiment, the ambient light panels 260A, 260B may incorporate a camera and/or other system for determining the angle made between the display 210 and the surface on which the ambient lighting effect is provided, and thereby, automatically adjust the angle of the ambient light source 250 to provide extension area(s) 230A, 230B.

In accordance with one embodiment of the present system, background portions of the video content may be segmented in homogeneous region blobs, such as object blobs 270 (e.g., the trees on the relatively uniform blue background). Many suitable segmentation algorithms may be used, such as based on color and/or texture. In one embodiment, the segmentation model may be guided with higher scene description information, such as metadata and/or other auxiliary data. In a further embodiment, this approximate background pattern may be repeated (e.g. as a low resolution periodical or statistical textural pattern) on either side of the display 210 and/or be repeated through different portions of a given ambient lighting effect provided in either or both of extension area(s) 230A, 230B. In this way, feature and/or object information may be discerned, for example, for only one portion of the extension area(s), and, for example, discerned background information may be repeated at regular and/or irregular intervals of the extension area(s) 230A, 230B. In accordance with one embodiment, SEI messages may include data to guide the segmentation by identifying background and foreground objects which may be used to provide the segmentation guidance for obtaining the right blobs. In another embodiment, the segmentation may be performed automatically, since the surrounding image may be a relatively low resolution image. In another embodiment utilizing micro-projectors, higher capacity ambient lighting imaging may be provided. The micro-projectors may be elongated along a substantial part of the ambient lighting panels 260A, 260B to facilitate an extension of the image(s)/content rendered.

Figure 3:
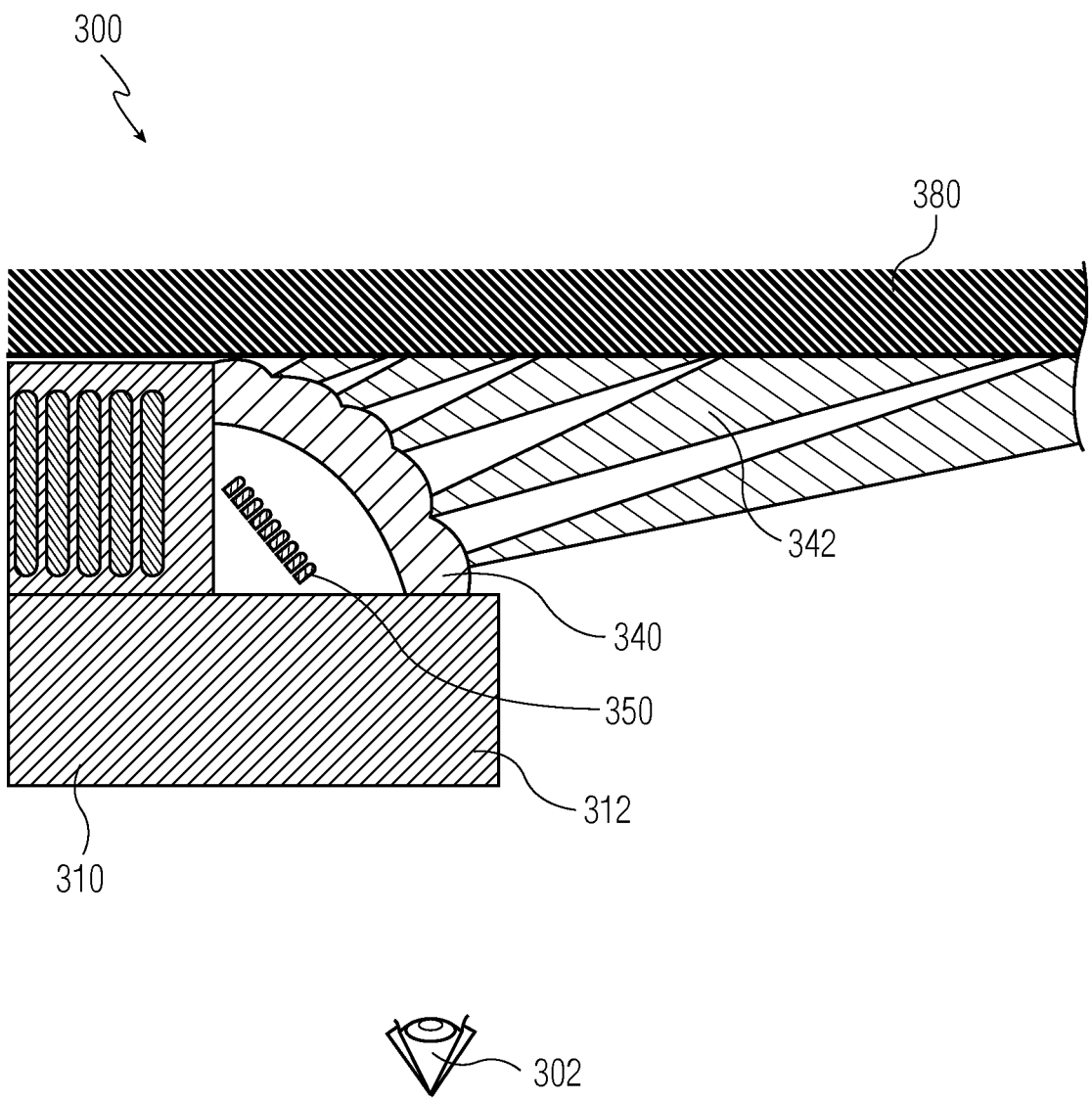
FIG. 3 shows an overhead view illustrating details of an ambient lighting system utilizing an ambient lighting source in accordance with an embodiment of the present system.

FIG. 3 shows an overhead view illustrating details of an ambient lighting system 300 utilizing an ambient lighting source 350 in accordance with an embodiment of the present system. Illustratively, the ambient lighting source 350 may include one or more two-dimensional (2D, M×N) LED array(s) or may include one or more micro-projector(s). As shown from a viewpoint 302 positioned in front of a display 310, a bezel 312 is provided substantially hiding portions of the system 300 from a viewer's vantage point, namely the viewpoint 302. A lens (system) 340, such as a diffusing (micro) lenses, may be provided to direct a diffused ambient lighting effect, shown as radiant ambient light cones 342, produced by the ambient lighting source 350. In one embodiment in accordance with the present system, the radiated light cones may be produced, for example, per pixel column of the ambient lighting source. The ambient lighting effect produced by the combination of the ambient lighting source 350 and the lens 340 is reflected off of a wall 380 in the illustrative embodiment. Naturally, in another embodiment, the ambient lighting source 350 may be provided separate from the display 310, such as by a separate projection device or microprojection device that is operatively coupled to the display 310 or at least to a source of the content displayed on the display 310.

Figure 4:
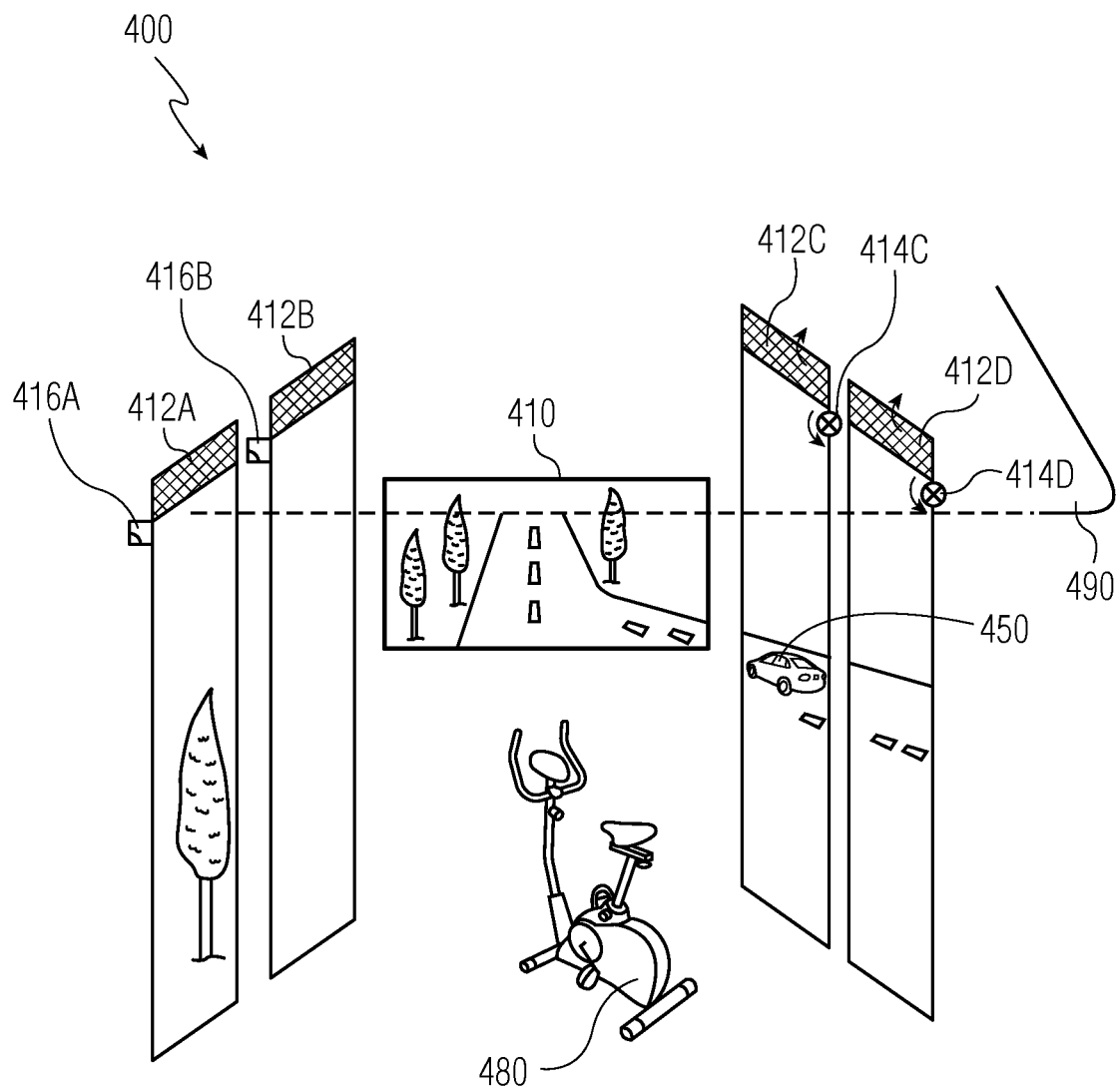
FIG. 4 shows an illustrative immersive peripheral lighting system in accordance with an embodiment of the present system.

FIG. 4 shows an illustrative immersive peripheral lighting system 400 in accordance with an embodiment of the present system. In the embodiment shown, separate secondary rendering devices, illustratively shown as peripheral displays 412A, 412B, 412C, 412D, may be utilized to provide a plurality of extension images beyond a primary rendering device, illustratively shown as a display 410. In one embodiment, each of the separate peripheral displays 412A, 412B, 412C, 412D may be illuminated by separate lighting systems, such as separate micro-projectors, to provide an immersive viewing experience for a user. In an alternate embodiment, one or more of the peripheral displays 412A, 412B, 412C, 412D may provide images independent of projection systems. The separate peripheral displays 412A, 412B, 412C, 412D may be positioned around a viewer perspective 480, such as provided by an exercise bicycle as in a home wellness solution. In another embodiment, the user may be provided with an immersive video game playing environment.

As may be readily appreciated, while the secondary rendering devices are illustratively shown as equally spaced and divided between the left and right sides of the primary rendering device, this is shown purely for illustration of the present system. As may be readily appreciated, the secondary rendering devices do not need to be symmetrically dispersed to the left and right of the primary rendering device. In fact, the secondary rendering devices may be positioned and dispersed in any fashion desirable by the user. In another embodiment, one or more of the secondary rendering devices may be positioned above and/or below the primary rendering device. In the same or another embodiment, more secondary rendering devices may be positioned to one side of the primary rendering device than on another side of the primary rendering device. If desired, the secondary rendering devices may be placed to one side (top, bottom, left, right) of the primary rendering device to the exclusion of another side of the primary rendering device. More or less secondary rendering devices may also be utilized in accordance with the present system.

In the embodiment shown, the user is provided with content (e.g., video) on a primary display (e.g., plasma display panel (PDP)) and auxiliary content may be provided, derived, etc., for the peripheral displays 412A, 412B, 412C, 412D. In this embodiment, since the peripheral displays 412A, 412B, 412C, 412D will mainly be viewed in peripheral vision of the user, the peripheral displays 412A, 412B, 412C, 412D may be relatively low-resolution although higher resolution displays may also be provided, yet the content rendered should relate (e.g., positionally, temporally, etc.) to the content provided on the primary display.

In a smaller room, the peripheral displays 412A, 412B, 412C, 412D may be affixed to walls surrounding the viewer perspective. In any event, the peripheral displays 412A, 412B, 412C, 412D should be operably positioned (e.g., positioned close enough to the viewer perspective 480) to render a peripheral view to the user. In an alternate embodiment, the peripheral displays 412A, 412B, 412C, 412D may be affixed to a ceiling of a room in which the immersive peripheral lighting system 400 is provided. In one embodiment, a ceiling plate 490 may be provided to facilitate positioning of the peripheral displays 412A, 412B, 412C, 412D. The panels may be permanently positioned or may be configured to enable positioning out of the way of traffic through the room when the peripheral displays 412A, 412B, 412C, 412D are not in use.

In accordance with one embodiment, the peripheral displays 412A, 412B, 412C, 412D may be attached in the desired position around the viewer perspective 480 (e.g., around a chair or home trainer), for example, through the use of a hook and fastener attachment system (e.g., Velcro™), enabling easy attachment/detachment and placement. In one embodiment, the peripheral displays 412A, 412B, 412C, 412D may be provided with a rolling mechanism, such as rolling mechanisms 414C, 414D illustratively shown on peripheral displays 412C, 412D. Naturally, the rolling mechanism may be concealed in the ceiling as desired. In this embodiment, the rolling mechanisms enable the peripheral displays 412C, 412D to be easily rolled up, out of the way, when not needed or rolled down when use of the peripheral displays 412C, 412D is desired. In an alternate embodiment, the peripheral displays may be affixed to the ceiling with a hinging mechanism, such as hinging mechanisms 416A, 416B illustratively affixed to the peripheral displays 412A, 412B. In this embodiment, the hinging mechanisms 416A, 416B enable the peripheral displays 412A, 412B to be rotated up towards the ceiling when not in use or rotated down when use of the peripheral displays 412A, 412B is desired. Naturally other systems for positioning the peripheral displays 412A, 412B, 412C, 412D may be suitably applied and may even be automated when use of the immersive peripheral lighting system 400 is desired.

In accordance with this embodiment, the immersive peripheral lighting system 400 may analyze the content provided on the display 410 (e.g., based on the previous and subsequent frames of content) and generate regions or blobs that substantially coincide with features and objects provided in the previous and/or subsequent frames of content. In one embodiment in accordance with the present system, the immersive peripheral lighting system 400 may also or in place of other frames of content, analyze current content to determine suitable features and blobs.

For example, a foreground car object 450 may be segmented (e.g., using 3D depth map, other extra data, and/or automatically from the content itself) and may continue its path as a blurred blob along one or more of the peripheral displays. Additionally, background features (e.g., the roadway) and objects (e.g., the trees) may be similarly depicted on one or more of the peripheral displays 412A, 412B, 412C, 412D. For example, in a simple variation of an algorithm to generate the peripheral image information, trees passing by/over may be emulated by a simple low frequency spatiotemporal light modulation, correlating with the tree information (e.g. periodicity) in the main display images. (Similar systems may be applied for ambient elements.) In one embodiment, details (e.g., resolution) of the features and/or objects provided as the features and/or objects proceed further into the peripheral vision of the user, may decrease to reduce analysis requirements for determining the features and/or objects, and/or to reduce undesirable image artifacts. For example, as the car object 450 proceeds from the peripheral display 412C to the peripheral display 412D, the car object 450 may change (e.g., in steps or gradually) from a car object to a car blob or the resolution of the image of the car object may simply be reduced. Similar reductions in the details provided by each of the peripheral displays 412A, 412B, 412C, 412D may be reduced as features and/or objects move further into the viewer's peripheral view (e.g., from right to left for the peripheral displays 412A, 412B and from left to right for the peripheral displays 412C, 412D). In one embodiment, the peripheral displays 412B, 412C may be enabled to provide a higher resolution than the peripheral displays 412A, 412D. In this way, potentially cheaper displays may be utilized for the peripheral displays 412A, 412D than used for the peripheral displays 412B, 412C enabling a reduction in a cost of the immersive peripheral lighting system 400.

In accordance with one embodiment, the immersive peripheral lighting system 400 (and/or an ambient lighting system with ambient lighting elements) may be provided with details of the peripheral displays 412A, 412B, 412C, 412D to enable a proper determination of the features and/or objects that are presented on the peripheral displays 412A, 412B, 412C, 412D. For example, in one embodiment, a size of the peripheral displays 412A, 412B, 412C, 412D compared to the display 410 may be provided for determining the features and/or objects that are depicted/rendered on the peripheral displays 412A, 412B, 412C, 412D (e.g., for continuing the car 450 path). Other parameters may also be provided to enable a determination of suitable features and/or objects, positioning and/or resolution thereof. In accordance with one embodiment, the peripheral display's display capabilities such as display resolution, maximum refresh rate, form of communication coupling (e.g., wired, wireless, optical, etc.) may also be manually and/or automatically communicated to the present system to enable operation. For example, for a peripheral display that has a maximum refresh rate that is less than the refresh rate of the primary display, the refresh rate of the features and/or objects provided on the peripheral display may be suitably adapted to provide for the slower refresh rate. For example, the frames provided on the peripheral display may be only updated once for every two or more frames that are updated on the primary display. A similar adaptation may be provided for an ambient lighting effect. This may have an added benefit of reducing the computational requirements for providing the ambient and/or peripheral effect.

In one embodiment, in a case wherein auxiliary data is provided (e.g. AMBX, SEI of AVC, etc.), the auxiliary data may be utilized for determining the features and/or objects that are provided to the secondary rendering device(s). In this embodiment, the auxiliary data may reduce processing demands at a site of the primary display and/or may be utilized for providing an accurate determination of the features and/or objects that are provided to the secondary rendering device(s). Further, the auxiliary data may facilitate an optimal positioning of features, objects (e.g., detailed and/or blobs) on the peripheral displays 412A, 412B, 412C, 412D, that may be configuration-dependent. For example, in a configuration where three peripheral displays are provided on either side, extended over angles X, an object, such as a dragon may look scarier if it is shown on the middle peripheral display, for example at a particular determined angle (e.g., angle Y), or towering "above" the user projected on the ceiling. For the same content, in a configuration with two peripheral displays, an embodiment of the present system may derive, for example, utilizing the auxiliary data, that a best depiction for the dragon is on the second pane, for example at an angle Z.

An example of how the auxiliary signal may parametrically specify the position of an object is the following:

A formula may be e.g.:

halfway the left side displayable extension, or a more complicated formula, specifying a percentage outside the main display (e.g., depending on size and resolution/aspect of the main display, but also on what can be displayed on the side panels (and/or by ambient lighting system); and/or one or more correction formula for different secondary display configurations, e.g. if three side panels are present and/or the angle of surround around the user is greater than, for example, 70 or 110 degrees, then elements determined to be halfway around, may, for example, be overwritten to two thirds (e.g., to place on the middle side panel).

In an embodiment wherein the local display system knows its geometry (e.g., panel placement, position), because the user has roughly measured and inputted after in-home configuration, through use of a suitable user interface provided in one embodiment of the present system, of 2 m high and 50 cm wide display area, 50 cms to the leftmost side of primary display (or the systems configures automatically, such as the panels transmit size and location information to the system via included localization means). In another embodiment, the system may include a vision system to identify size and/or position information of the panels.

The system may then apply a mapping to display the object as close to what is indicated in a profile (e.g., provided by content artists at creation side for maximal impact). For example, the system may calculate that the halfway positioning corresponds to a pixel position (1250, 999) on the first left peripheral display for the car object at a given time t.

Naturally, in accordance with an embodiment, the system may ignore or correct a suggested/provided profile and apply a local profile and/or a profile provided by the user.

In addition, although in a simplified version, a system in accordance with an embodiment may use this positioning only on a most obviously extractable object (e.g., a large object/element passing-by foreground object/element), of course guiding data of any complexity and/or multiple complexities, may be associated with the content (e.g., included in a broadcast signal), starting from a rough box which is projected to the periphery together with some background data, to a very accurate description on how the object should appear given what is in a particular way extractable from all the images received, and/or including auxiliary correcting data (e.g., for a flame which the dragon breaths when it moves through the periphery displays, even in a case wherein this extra data was never in the set of images). Accordingly, the auxiliary data may even supplement data determinable from the content (e.g., image frames) and provide additional data to add elements and/or supplements to elements to add further value to systems that are enabled to render the additional data.

In one embodiment in accordance with the present system, the auxiliary data may also include video data or data for correcting/improving predicted video data. For example, in accordance with an embodiment of the present system, the background trees may be very simply summarized as light-dark (e.g., green) transitions, thereby simplifying the processing required to simulate a shadow wavy pattern of driving under the trees. Such a simulation may be performed by tracking regions of the image (e.g., on the basis of segment statistics).

One or more of the peripheral displays may be fabricated from a photonic textile, such as fabricated from the Lumalive™ photonic textile, available from Koninklijke Philips Electronics N.V. The photonic textile is configured to emit images, such as low-resolution images, and accordingly may serve as one or more of the peripheral displays. In one embodiment, the photonic textile may serve as one or more of the peripheral displays and also may serve other purposes. For example, a curtain positioned in the room that is fabricated from the photonic textile may link and synchronize via coupling, such as a network connection (e.g., wired, wireless, optical, etc.) to the main display (e.g., the display 410) when the system in accordance with an embodiment is operable. When the system is not operating, the photonic textile may be inactive, or may autonomously or be controlled to display other images. Naturally, as may be readily appreciated, any one or more of the displays of the present system may operate similarly whether or not the displays are fabricated from the photonic textile.

In one embodiment, one or more of the displays (e.g., ambient lighting display, peripheral display, etc.) may be fabricated as an electronic-ink (e-ink) display or other reflective display. Such a display, for example as utilized as a peripheral display, may take the form of e-ink wallpaper. The e-ink wallpaper may display images in accordance with the present system when the system is operational and may display other images, such as a wallpaper pattern, when the system is not operational. In one embodiment, an e-ink photo-frame and/or larger frame(s) may operate as one or more ambient and/or peripheral displays. The frames may show paintings and/or pictures when not being controlled by the main display to operate as a peripheral display. In accordance with an embodiment of the present system, the extension images may be provided at a lower resolution, lower refresh rate, etc., than the primary display device as determined by the display capabilities of the display.

Other networked image sources, such as photo-frames, etc., may be utilized as peripheral displays and/or ambient lighting sources. The networked image sources may be added to the system automatically through self identification and/or an automated querying system to identify the availability and capability of the networked image sources, as well as a relative positioning of the networked image sources. In this way, additional image and/or ambient lighting sources may be added and removed from the system without requiring a cumbersome setup procedure. In an alternate embodiment, a one-time setup procedure may be performed in which the display characteristics, position, etc., is specified. The primary display may then automatically link to the secondary display(s) (e.g., peripheral displays, ambient lighting displays, etc.) to provide the peripheral and/or ambient lighting effects when desired. In one embodiment, an introduction of a display device and/or device with a display and/or lighting capability within an area of the system may initiate production of a user interface on the primary display and/or the device to enable registration of the device as part of the present ambient lighting and/or peripheral imaging system. In one embodiment, a combination of ambient and peripheral lighting effects may be provided wherein a portion of the effects are provided as ambient lighting effects and a portion of the effects are provided as peripheral effects. In a further variation, secondary displays may also have an ability to produce an ambient lighting effect in accordance with the present system. Naturally, other combinations may be readily applied in accordance with the present system.

In an embodiment in accordance with the present system, during extension of the content to peripheral and/or ambient devices, artifacts may appear, due, for example, to a limit in an accuracy of a global/local motion model when applied, that may degrade the resolution, quality and/or position of objects depicted by the peripheral and/or ambient devices. Therefore it may be desirable that all "extension data" (e.g., data utilized for driving the peripheral and/or ambient lighting devices) determined for the peripheral and/or ambient devices have a limited temporal persistence, thereby assisting in a certain degree of accuracy of the data. In one embodiment, a fallback scenario may be implemented by using at least part of the extension data as well as "typical ambient lighting data", such as data derived from a currently depicted frame of content, for driving the secondary devices. For example, in one embodiment, extension data determined from frames that are temporally near the current frame, are predominantly utilized for determining what is rendered by the peripheral and/or ambient devices over the typical ambient lighting data. However, as a particular portion of the extension data becomes more temporally remote (ages) from the data (features, objects, background, foreground, etc.) currently depicted in the primary display, the typical ambient lighting data may gradually be utilized to replace the aging extension data, by for example, a recursive filtering system. In case typical ambient lighting data is not available, a default color and/or lighting may also be utilized. This replacement of what is rendered by the secondary devices may be performed feature by feature and object by object. For example, portions of the extension data, even provided by a single extension device, may be "fresher" than other portions of the extension data. Accordingly, in one embodiment in accordance with the present system, this substituting process may be performed feature by feature and object by object. In addition, in a case of a detected scene change wherein depicting portions of preceding portions of content is no longer suitable due to the scene change, the peripheral lighting system and/or ambient lighting system may determine content for the secondary rendering device utilizing content currently depicted on the primary display and/or default color (e.g., intensity, hue, saturation, etc.) and/or lighting.

Figure 5:
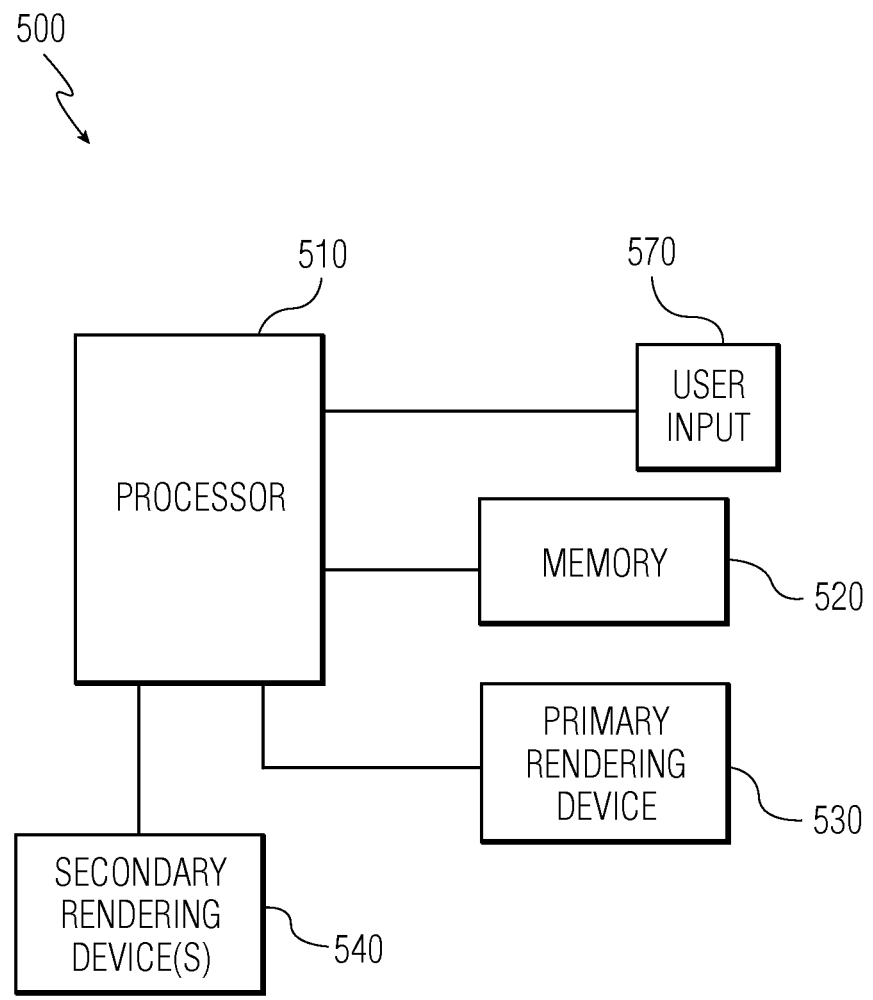
FIG. 5 shows a system in accordance with an embodiment of the present system.

FIG. 5 shows a system 500 in accordance with an embodiment of the present system. The system has a processor 510 operationally coupled to a memory 520, a primary rendering device 530, one or more secondary rendering device(s) 540 and an input/output (I/O) device 570. The term rendering device as utilized herein is intended to relate to any device that may render content in accordance with the present system. Accordingly, a primary rendering device may be a video display device, such as a television device and a secondary rendering device may be a device, such as an ambient lighting device and/or a peripheral rendering device. The memory 520 may be any type of device for storing application data as well as other data, such as content frame data. The application data and other data, such as feature and object data, are received by the processor 510 for configuring the processor 510 to perform operation acts in accordance with the present system. The operation acts include controlling at least one of the display 530 to display content and controlling the secondary rendering device in accordance with the present system. The input/output 570 may include a keyboard, mouse, or other devices, including touch sensitive displays, which may be stand alone or be a part of a system, such as part of a personal computer, personal digital assistant, and display device such as a television, for communicating with the processor 510 via any type of link, such as wired or wireless link. Clearly the processor 510, memory 520, primary rendering device 530, secondary rendering device 540, and/or I/O device 570 may all or partly be a portion of a television platform, such as a television based content rendering device.

The methods of the present system are particularly suited to be carried out by a computer software program, such computer software program preferably containing modules corresponding to the individual steps or acts of the methods. Such software may of course be embodied in a computer-readable medium, such as an integrated chip, a peripheral device or memory, such as the memory 520 or other memory coupled to the processor 510.

The computer-readable medium and/or memory 520 may be any recordable medium (e.g., RAM, ROM, removable memory, CD-ROM, hard drives, DVD, floppy disks or memory cards) or may be a transmission medium (e.g., a network comprising fiber-optics, the world-wide web, cables, and/or a wireless channel, for example using time-division multiple access, code-division multiple access, or other radio-frequency channel). Any medium known or developed that can store and/or provide information suitable for use with a computer system may be used as the computer-readable medium and/or memory 520.

Additional memories may also be used. The computer-readable medium, the memory 520, and/or any other memories may be long-term, short-term, or a combination of long-term and short-term memories. These memories may configure processor 510 to implement the methods, operational acts, and functions disclosed herein. The memories may be distributed or local and the processor 510, where additional processors may be provided, may also be distributed, as for example based within the primary rendering device, and/or one or more of the secondary rendering devices, or may be singular. The memories may be implemented as electrical, magnetic or optical memory, or any combination of these or other types of storage devices. Moreover, the term "memory" should be construed broadly enough to encompass any information able to be read from or written to an address in the addressable space accessed by a processor. With this definition, information on a network is still within memory 520, for instance, because the processor 510 may retrieve the information from the network for operation in accordance with the present system.

The processor 510 and memory 520 may be any type of processor/controller, microcontroller and/or memory. The processor 510 is capable of providing control signals and/or performing operations in response to input signals from the I/O device 570 and executing instructions stored in the memory 520. The processor 510 may be an application-specific or general-use integrated circuit(s). Further, the processor 510 may be a dedicated processor for performing in accordance with the present system or may be a general-purpose processor wherein only one of many functions operates for performing in accordance with the present system. The processor 510 may operate utilizing a program portion, multiple program segments, or may be a hardware device utilizing a dedicated or multi-purpose integrated circuit.

Of course, it is to be appreciated that any one of the above embodiments or processes may be combined with one or more other embodiments or processes in accordance with the present system. For example, although certain systems, algorithms, techniques are described herein with regard to either an ambient lighting system or a peripheral image system, as may be readily appreciated, many of these may be applied in either system and/or in a combined system.

Finally, the above-discussion is intended to be merely illustrative of the present system and should not be construed as limiting the appended claims to any particular embodiment or group of embodiments. Thus, while the present system has been described in particular detail with reference to specific exemplary embodiments thereof, it should also be appreciated that numerous modifications and alternative embodiments may be devised by those having ordinary skill in the art without departing from the broader and intended spirit and scope of the present system as set forth in the claims that follow. For example, while in the illustrative discussion, ambient lighting elements and peripheral rendering devices are illustrated as devices that are physically separate from the primary display device, this is not intended as a limitation unless specifically stated. For example, in one embodiment, the primary rendering device (e.g., primary display) and the secondary rendering device represent portions of a single rendering device. In this embodiment, the rendering device may be a large rendering device, such as fashioned as a portion of a wall based display. In this embodiment, different portions of the rendering device may operate as primary and secondary rendering devices. Further modifications are intended within the scope of the present system. Accordingly, the specification and drawings are to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise; and h) no specific sequence of acts or steps is intended to be required unless specifically indicated.

The invention claimed is:

1. A method of embedding an auxiliary image signal in a transmission stream including a plurality of sequential portions having elements, the method comprising acts of:
   utilizing the auxiliary image signal for enabling rendering of a secondary element related to an element of a current portion of the plurality of sequential portions, the secondary element occurring previous or subsequent to the current portion,
   arranging the auxiliary image signal to describe the secondary element suitable for continuation of a display of the current portion on a primary device to a secondary device, the auxiliary image signal having a positioning profile; and
   enabling to position at a plurality of time instants the secondary element on the secondary device concurrent to the display of the current portion.

2. The method of claim 1, wherein the secondary elements are rendered at a lower resolution than the current portion.

3. The method of claim 1, wherein the secondary elements are rendered at a varying resolution determined based on at least one of a spatial and temporal position of the rendered secondary elements in relation to the elements of the current portion.

4. The method of claim 1, wherein the secondary elements are rendered at a resolution that is determined based on a position of the rendered secondary elements in relation to the elements of the current portion.

5. The method of claim 4, wherein the secondary elements are rendered at a resolution that is determined based on a temporal position of the rendered secondary elements in relation to the elements of the current portion.

6. The method of claim 1, wherein the auxiliary image signal is described in a framework of a standard of data auxiliary to the elements of the plurality of portions of the image content.

7. The method of claim 6, wherein the auxiliary image signal is comprised of one of Ambient Experience data and Supplemental Enhancement Information.

8. The method of claim 1, wherein the secondary elements are rendered as ambient lighting elements.

9. The method of claim 1, wherein the secondary elements are rendered as peripheral image elements.

10. The method of claim 1, wherein the secondary elements are determined based on a position of the secondary device with respect to the primary device.

11. The method of claim 1, wherein the secondary elements are determined based on a position of each of a plurality of secondary devices with respect to the primary device.

12. The method of claim 1, wherein the secondary elements are rendered for one of a plurality of secondary devices positioned to one side of the primary device and another one of the plurality of secondary devices positioned to another side of the primary device.

13. The method of claim 1, wherein the secondary elements are rendered at a slower frame rate than the elements of the current portion.

14. The method of claim 1, wherein the secondary elements are related through at least one of motion and geometric relations to the elements of the current portion.

15. The method of claim 14, wherein at least one sub-region appears at a certain instant on the primary device, and further comprising acts of:
   tracking the at least one sub-region; and
   performing motion analysis of the motion of the at least one sub-region to determine at least one secondary element.

16. The method of claim 15, wherein the motion analysis is performed on a basis of a continuation of motion in the image content rendered on the primary device.

17. The method of claim 15, wherein the motion analysis is a projection of motion identified from the current portion to a geometrical positioning of the secondary device.

18. The method of claim 17, wherein the geometrical positioning includes at least one of a position of the secondary devices with relation to the primary devices and a ratio of a size of the content rendered on the primary and secondary devices.

19. An application embodied on a non-transitory computer readable medium configured to render on primary and secondary devices image content including a plurality of sequential portions having elements, the application comprising:
   a first program to identify a current portion of the plurality of sequential portions for rendering on the primary device;
   a second program to determine secondary elements of one or more of the plurality of sequential portions of previous and subsequent the current portion that are spatially or temporally related to the elements of the current portion;
   a third program to identify an auxiliary image signal for rendering of the secondary elements;
   a fourth program to arrange the auxiliary image signal to describe the secondary elements suitable for continuation of a display of the current portion on the primary device to the secondary device, the auxiliary image signal having a positioning profile;

a fifth program to render the current portion on the primary device and to render at a plurality of time instants the secondary elements on the secondary device concurrent with the display of the current portion on the primary device.

20. The application of claim 19, wherein the secondary elements are rendered at a lower resolution than the current portion.

21. The application of claim 19, wherein the secondary elements are rendered at a varying resolution determined based on a position of the secondary elements in relation to the elements of the current portion.

22. The application of claim 19, wherein the secondary elements are rendered at a resolution that is determined based on a position of the rendered secondary elements in relation to the elements of the current portion.

23. The application of claim 22, wherein the secondary elements are rendered at a resolution that is determined based on a temporal position of the rendered elements in relation to the elements of the current portion.

24. The application of claim 19, wherein the auxiliary image signal is comprised of one of Ambient Experience data and Supplemental Enhancement Information.

25. The application of claim 19, wherein the elements are rendered as ambient lighting elements.

26. The application of claim 19, wherein the secondary elements are rendered as peripheral image elements.

27. The application of claim 19, wherein the secondary elements are rendered based on a position of the secondary device with respect to the primary device.

28. The application of claim 19, wherein the secondary elements are rendered based on a position of each of a plurality of secondary devices with respect to the primary device.

29. The application of claim 19, wherein the secondary elements are rendered for one of a plurality of secondary devices positioned to one side of the primary device and another one of the plurality of secondary devices positioned to another side of the primary device.

30. The application of claim 19, wherein the secondary elements are rendered at a slower frame rate than the elements of the current portion.

31. A processor for rendering image content on primary and secondary devices, the image content including a plurality of sequential portions having elements, the processor comprising a coupling configured for operable coupling to each of the primary and secondary devices, wherein the processor is configured to:
    identify a current portion of the plurality of sequential portions for rendering on the primary device;
    determine secondary elements of one or more of the plurality of sequential portions previous and subsequent to the current portion that are positionally related to the elements of the current portion;
    identify an auxiliary image signal for enabling rendering of the secondary elements related to an element of the current portion of the plurality of sequential portions;
    provide the current portion for rendering on the primary device;
    arrange the auxiliary image signal to describe the secondary elements suitable for continuation of a display of the current portion on the primary device to the secondary device, the auxiliary image signal having a positioning profile; and
    provide the secondary elements at a plurality of time instants for rendering on the secondary device concurrent with the rendering of the current portion on the primary device.

32. The processor of claim 31, wherein the secondary elements are provided at least at one of a lower resolution and a slower frame rate than the current portion.

33. The processor of claim 31, wherein the secondary elements are provided at a varying resolution determined based on a position of the provided secondary elements in relation to the elements of the current portion.

34. The processor of claim 31, wherein the secondary elements are provided at a resolution that is determined based on a position of the rendered elements in relation to the elements of the current portion.

35. The processor of claim 34, wherein the secondary elements are provided at a resolution that is determined based on a temporal position of the provided secondary elements in relation to the elements of the current portion.

36. The processor of claim 31, wherein the auxiliary image signal is comprised of one of Ambient Experience data and Supplemental Enhancement Information.

37. The processor of claim 31, wherein the secondary elements are provided as at least one of ambient lighting elements and peripheral image elements.

38. The processor of claim 37, wherein the secondary elements are provided as ambient lighting elements, and the secondary device comprises at least one of a light emitting diode array and a pico-projector.

39. The processor of claim 31, wherein the secondary elements are provided based on a position of the secondary device with respect to the primary device.

40. The processor of claim 31, wherein the secondary device comprises a plurality of secondary devices, and the secondary elements are provided based on a position of each of the plurality of secondary devices with respect to the primary device.

41. The processor of claim 31, wherein the secondary device comprises a plurality of secondary devices, and the secondary elements are provided based on a position of each of the secondary devices with respect to the primary device.

42. The processor of claim 31, wherein the secondary device comprising a plurality of secondary devices, and the secondary elements for one of the plurality of secondary devices are provided positioned to one side of the primary device and another one of the plurality of secondary devices positioned to another side of the primary device.

43. The processor of claim 31, further configured to determine the secondary elements based on at least one of a spatial and temporal position and in relation to the elements of the current portion.

44. The method of embedding the auxiliary image signal of claim 1, wherein the auxiliary image signal identifies the secondary element as one of a foreground and background.

45. The method of embedding the auxiliary image signal of claim 1, wherein the positioning profile includes a parametric position function for a border pixel of the secondary element.

46. The method of embedding the auxiliary image signal of claim 45, wherein the parametric position function includes a bounding box description for the secondary element.

47. The method of embedding the auxiliary image signal of claim 1, wherein the auxiliary image signal includes a modification profile that identifies at least one of a color and brightness change for the secondary element as the secondary element is displayed on the secondary device.

48. The method of embedding the auxiliary image signal of claim 47, wherein the modification profile includes at least one of color and textural characteristics arranged to enable an accurate segmentation of the secondary element.

49. The method of embedding the auxiliary image signal of claim 48, wherein the modification profile includes transformation data, arranged to enable at least one of a spatio-temporal perspective transformation, a sharpness transformation, and a detail modification of the element as the secondary element is displayed on the secondary device.

50. A method of rendering on primary and secondary devices image content including a plurality of sequential portions having elements, comprising:
   receiving in a processor a content signal including the plurality of sequential portions;
   receiving in the processor an auxiliary image signal including a secondary element related to an element of a current portion of the plurality of sequential portions, the secondary element occurring previous or subsequent to the current portion;
   arranging the auxiliary image signal in the processor to describe the secondary element for continuation of a display of the current portion on the primary device to the secondary device, the auxiliary image signal having a positioning profile; and
   rendering at a plurality of time instants the secondary element on the secondary device concurrent to the display of the current portion on the primary device.

51. A method of enabling rendering on primary and secondary devices image content including a plurality of sequential portions having elements, comprising:
   transmitting to a processor in a receiving system a content signal including the plurality of sequential portions;
   transmitting to the processor an auxiliary image signal including a secondary element related to an element of a current portion of the plurality of sequential portions, the secondary element occurring previous or subsequent to the current portion;
   providing the auxiliary image signal in the receiving system with a positioning profile, the auxiliary image signal being configured to describe the secondary element for continuation of a display of the current portion on the primary device to the secondary device; and
   providing for rendering at a plurality of time instants the secondary element on the secondary device concurrent to the display of the current portion on the primary device.

52. A television receiving platform for processing an image content signal, comprising:
   a memory module configured to store content data corresponding to the image content signal; and
   a processor coupled to the memory module, configured to:
      receive the image content signal including a plurality of sequential portions having a plurality of elements,
      receive an auxiliary image data with the image content signal, the auxiliary image data including a secondary element related to an element of a current portion of the plurality of sequential portions, the secondary element occurring previous or subsequent to the current portion,
      arrange the auxiliary image data in the processor to describe the secondary element for continuation of a display of the current portion from a primary device to a secondary device, the auxiliary image data having a positioning profile, and
      render at a plurality of time instants the secondary element on the secondary device concurrent to the display of the current portion on the primary device.

* * * * *